United States Patent Office 2,931,789
Patented Apr. 5, 1960

2,931,789

POLYAMIDES FROM PINIC ACID

Edward A. Wielicki, Philadelphia, Pa., assignor to American Viscose Corporation, Philadelphia, Pa., a corporation of Delaware No Drawing. Application April 25, 1958
Serial No. 730,800

19 Claims. (Cl. 260—78)

This invention relates to new polyamides and more particularly to polyamides derived from pinic acid, homopinic acid and norpinic acid.

This application is a continuation-in-part of my copending application Serial No. 371,407, filed July 30, 1953, now abandoned.

The forming of polymers by the condensation of a dibasic acid with a diamine has been known for some time. U.S. Patent 2,130,523 to Wallace H. Carothers discloses polyamides so formed having unusual resistance to solvents. It was also disclosed that filaments spun from high molecular weight polyamides have unusual strength which is greatly increased by cold drawing. The transparency of these filaments, however, decreases as they are cold drawn.

One of the objects of this invention is to prepare a new and distinctive class of polyamides. Another object is to provide polyamides with exceptional transparency that is not destroyed when filaments of the polymer are oriented as by drawing. A further object is to manufacture products useful in the plastic, molding, coating, sizing, adhesive and related arts with high transparency and other properties superior to those products made from heretofore known polyamides. Other objects will appear hereinafter.

It has now been found that these objects may be accomplished by reacting pinic, homopinic and norpinic acids or derivatives thereof with a diamine. The acids correspond to the following structural formula:

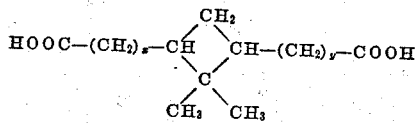

wherein $x$ and $y$ are 0 or 1. Pinic acid is represented by the formula when $x=0$ and $y=1$; homopinic acid, when $x=1$ and $y=1$; and, norpinic acid, when $x=0$ and $y=0$.

Examples of the acid derivatives which may be used include halides such as the chlorides and bromides, esters such as methyl, ethyl, decyl and phenyl esters, and amides such as pinamide, homopinamide and norpinamide.

The diamines satisfactory for use in this invention are represented by the following structural formula:

$$R_1\text{—NH—R—NH—}R_2$$

wherein R is a divalent organic radical having at least 2 carbon atoms and may be aliphatic, aromatic, alicyclic, or a combination of two or more of these different types. R may have elements other than carbon in the molecular chain such as oxygen, nitrogen, or sulfur. The diamine will react more readily with the acids or derivatives when R is an aliphatic or substituted aliphatic radical, i.e., where the amine groups are not directly linked to an atom in a ring structure. The following are examples of R:

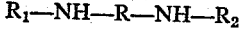

where $n$ is an integer from 2 to 20;

$$-(CH_2)_{n'}-O-(CH_2)_{n''}-$$

where $n'$ is an integer from 2 to 4 and $n''$ is an integer from 2 to 4;

$$-(CH_2)_{n'}-S-(CH_2)_{n''}-$$

when $n'$ is an integer from 2 to 4 and $n''$ is an integer from 2 to 4;

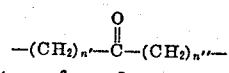

when $n'$ is an integer from 2 to 18 and $n''$ is an integer from 2 to 18;

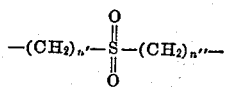

when $n'$ is an integer from 2 to 18 and $n''$ is an integer from 2 to 18;

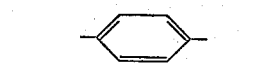

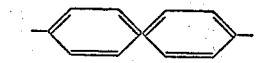

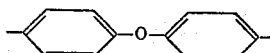

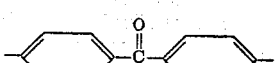

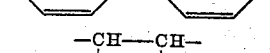

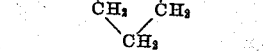

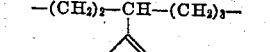

$R_1$ and $R_2$ are hydrogen atoms or alkyl radicals such as methyl, ethyl and isobutyl preferably having a chain length of from one to six carbon atoms.

The above-described reactants may be directly reacted first reacted with a diamine to form an ammonium salt to form the polyamides of this invention but the polymerization is more complete if the acid or derivative is which is preferably isolated and subsequently polymerized by heating. In general, the salt will precipitate from a mixture of the acid and a diamine in a mutual solvent. It is sometimes necessary to cool the mixture as one reactant is gradually added to the other to prevent partial polymerization during the initial salt-forming stage.

The reaction temperature for both polymerization of the salt and direct polymerization of the acids and a diamine differs somewhat with the particular reactants employed but the approximate range is from 100° C. to 300° C. and preferably 150° C. to 250° C. The polymerization is a condensation reaction which involves the formation of a by-product, such as water, alcohol, phenol, hydrogen chloride or amomnia, depending upon whether an acid or a derivative of an acid is used. Generally, it is desirable to effect the reaction under conditions which permit the escape of the water or other by-products because the removal of such by-products promotes the attainment of higher molecular weight polymers. The polymerization reaction is preferably carried out in the absence of air and sometimes the addition of anti-oxidants is desirable. The reaction will take place in solvents, non-solvents, or a combination of solvents and non-solvents for the polymer. While it is usually unnecessary to use a catalyst, inorganic material of alkaline reaction, such as calcium oxide or carbonate and acidic materials, such as halogen salts including chlorides and bromides of polyvalent elements, e.g. aluminum or tin, may be used as catalysts. In preparing the polyamides derived from pinic acid as distinguished from those known in prior art, the polymerization is more readily effected than with known reactants and a vacuum is not required to bring the reaction to equilibrium. The polymerization, however, may be carried out in an open or closed reaction vessel under atmospheric, sub-atmospheric or super-atmospheric pressures.

Polyamides derived from the acids and derivatives as enumerated above which may be prepared as described above have broad application as coatings, films, fibers, and molding materials because they combine high transparency with ease of solubility, and compatibility with cellulose, cellulose derivatives, resins, plasticizers, drying oils, pigments and dyes. Solvents for the various polyamides of this invention include the following as well as compatible mixtures thereof: alcohols such as ethanol, propanol, and diethylcarbinol; hydroxyethers such as diethylene glycol; dimethylformamide; and formic acid. Aromatic hydrocarbons such as benzene, toluene, and xylene and esters such as methylacetate, butyl acetate, and ethyl propionate may be incorporated as diluents in solutions of the polyamides.

In general, when the diamine employed has less than five carbon atoms in the molecular chain, the resulting polymer will be water soluble but when there are five or more carbons in the diamine it is insoluble in water. The polymers may be plasticized with well known agents such as triacetin, triphenyl phosphate and esters of polycarboxylic acids including dibutyl phthalate, dihexyl pinate, crotyl-butyl succinate, and carnaubyloctyl adipate.

Clear, hard, durable coatings may be made by dissolving the polyamides with or without a suitable plasticizer in a solvent and applying by dipping, spraying, or brushing. The ratio of polymer to solvent for a given solution will vary in accordance with particular applications. Solutions of from 3% to 20% by weight of polymer are suitable for general use. The polyamides may also be components of paints, lacquers, and varnishes. Surfaces of aluminum, brass, stainless steel, steel, wood, glass, cellophane, paper, and film-forming materials may be easily coated with the above solutions and the resulting coating cannot be loosened by prolonged immersion in a non-solvent or by flexing the material which has been coated. Self-supporting films may also be formed from the polyamides by spreading or extruding a solution or molten mass of these polymers. The films may be stretched laterally and/or longitudinally to increase strength. The films or coatings may be tinted or pigmented for decorative of polarizing effect. Photographic film, optical lenses, yarns and fabrics may be coated with these polyamides. Water soluble polyamides are useful water soluble sizes for yarns and fabrics. Self-supporting films may be used in safety glass, as photographic film, and for packaging material.

Fibers or filaments may also be formed from polyamides by usual procedures such as melt, wet, or dry spinning. Fibers formed by the above procedures and thereafter subjected to drawing show increased strength with a high degree of orientation along the fiber axis as indicated by examination between crossed Nicol prisms and unexpectedly are completely transparent. Fabrics formed from continuous filaments or spun fibers of these new polymers have unusually good hand, dye reception, and optical properties. Articles of other shapes such as tubes, rods and strips may be continuously extruded from the materials of this invention. They may also be easily molded into many forms and shapes of individual articles. Suitable molding powders may be prepared from these polyamides for conveniently forming these articles. Plasticizers, fillers, dyes, and pigments as noted above may be incorporated with the polymer to be drawn, shaped, cast, or molded.

Polypinamides are generally non-crystalline in nature and highly transparent and have further exceptional usefulness as plasticizers for other film-forming, filamentary, and molding materials such as cellulose acetate and resins including vinyl, vinylidene, acrylic, acrylonitrile, phenol formaldehyde, ureaformaldehyde, polyamide, and polyester resins. For example, commercial 6–6 nylon (polyhexamethylene adipamide) may be ground with from 25 to 50% of polyhexamethylenepinamide and the mixture melt extruded to form filaments in the usual manner. The new product has increased extensibility without destroying tenacity and other known desirable properties of the nylon. Upon ageing, the transparency of this product remains unchanged and no discoloration or other evidence of unstability occurs.

The following examples are illustrative and show preferred embodiments of the invention.

I. PREPARATION OF THE AMINE SALTS OF PINIC ACID

*Example 1*

Ethylenediammonium pinate was prepared by the addition of 6 grams (0.1 mole) of ethylenediamine to a solution of 18.6 grams (0.1 mole) of pinic acid in 150 cc. of ethanol with cooling. A white solid precipitate formed during the addition. The crude salt was recrystallized twice from a mixture of 15 volumes of ethanol and 2 volumes of water. The pure dry salt had a melting point of 174° C. to 176° C.

*Example 2*

Hexamethylenediammonium pinate was prepared by the addition of a solution of 11.6 grams (0.1 mole) of hexamethylenediamine in 85 cc. of ethanol to a solution of 18.6 grams (0.1 mole) of pinic acid in 75 cc. of ethanol with constant cooling. The white solid precipitate was filtered off and allowed to dry. The crude salt was recrystallized 3 times from a mixture of 3 volumes of methanol and 1 volume of isopropanol. The pure product had a melting point of from 198° C. to 200° C.

*Example 3*

Decamethylenediammonium pinate was prepared by the addition of a solution of 17.2 grams (0.1 mole) of decamethylenediamine in 75 cc. of ethanol to a solution of 18.6 grams (0.1 mole) of pinic acid in 75 cc. of ethanol with constant cooling. An excess of isopropanol was added to the solution to precipitate the product. The salt was then filtered off and was recrystallized 3 times from a mixture of 3 volumes of methanol and 8 volumes of isopropanol. The purified salt had a melting point of 167° C. to 168° C.

*Example 4*

The salt of pinic acid and gamma, gamma' diaminopropyl ether was prepared by the addition of a solution of 13.2 grams (0.1 mole) of gamma, gamma' diaminopropyl ether in 150 cc. of dry dioxane to a solution of 18.6 grams (0.1 mole) of pinic acid in 150 cc. of dry dioxane. The resulting mixture was allowed to stand, and the salt was collected by suction filtration.

The salts of homopinic and norpinic acids are prepared in like manner. The salts of homopinic acid have essentially the same melting points as those of pinic acid.

II. PREPARATION OF POLYAMIDES

*Example 5*

Polyethylenepinamide was prepared by placing 10 grams of ethylenediammonium pinate in a small distilling flask heated in a bath of silicone oil at 200° C. During the entire heating, nitrogen was allowed to flow through the flask in order to protect the contents from atmospheric oxygen. During the reaction, water distilled from the flask and the light-colored melt within the flask became very viscous. The flask was removed from the bath at the end of two hours and allowed to cool. The polymer formed adhered to a metal surface maintained at 140° C. to 145° C. Filaments were formed from the polymer by heating to 180° C. to 185° C. and extruding a thin stream of the melted polymer. The filaments were transparent and soluble in water and in dimethylformamide at room temperature.

*Example 6*

Polyhexamethylenepinamide was prepared from hexamethylenediammonium pinate in the same manner as in Example 5 except that a temperature of 210° C. was used instead of 200° C. The resulting polymer was glass-like, was insoluble in water and soluble in dimethylformamide. The polymer became tacky and adhesive at 130° C. to 135° C. Filaments were formed by extruding at a minimum temperature of about 165° C. When drawn, these filaments showed increased strength and molecular orientation along the fiber axis as indicated by examination between crossed Nicol prisms. After being drawn, the filaments remained completely transparent. Cellophane strips were dipped in an ethanol solution containing about 10% by weight of this polymer and then oven-dried. The resulting coating was very clear, hard, waterproof, and could not be peeled from the cellophane even after two hours' soaking in water. This solution was also used to coat well cleaned metal strips of aluminum, brass, stainless steel and steel. The coatings on metal were also fully transparent and could not be peeled off when the six inch metal strips were bent double. Quantities of 6–6 nylon (polyhexamethyleneadipamide) and this polypinamide were first ground in a Wiley mill to a size of 20 mesh. Four samples were prepared for spinning as follows: (1) 100% nylon; (2) 75% nylon, 25% polypinamide; (3) 50% nylon, 50% polypinamide; (4) 25% nylon, 75% polypinamide. These mixtures were melt spun into filaments and cold-drawn. Those filaments containing 25% and 50% respectively of the polypinamide were more extensible than 100% nylon and were approximately as high in tensile strength as the 100% nylon.

*Example 7*

Polydecamethylenepinamide was prepared from decamethylenediammonium pinate using the same procedure as that employed in Example 5. The polymer was glasslike, insoluble in water and soluble in dimethyl formamide. The polymer became adhesive and tacky at 95° C. to 100° C. Filaments were formed by extruding at a minimum temperature of about 140° C. The filaments when cold-drawn retained complete transparency.

*Example 8*

Polydiphenylpinamide was prepared by placing 9.21 grams (0.05 mole) of benzidine and 9.30 grams (0.05 mole) of pinic acid in a distilling flask and heating for 2 hours at 200° C. During the entire heating, the mixture was blanketed with nitrogen. The product was a transparent polymer. It became adhesive and tacky at 155° C. to 160° C. and filaments were formed by extruding a thin stream from the molten polymer at 170° C. to 175° C. The polymer was soluble in dimethylformamide.

*Example 9*

A polyamide was prepared from pinic acid and gamma, gamma' diaminopropyl ether by placing 10 grams of the salt prepared in Example 4 in a small distilling flask and heating for 4 hours at 200° C. During the entire heating, the salt was blanketed with nitrogen. A transparent polymer was produced from which filaments could be extruded at a temperature of 95° C. to 100° C. The polymer became tacky and adhesive at 75° C. to 80° C. The polymer was soluble in dimethylformamide. A 10% solution of this polymer in ethanol was used to coat cellophane strips by dipping and then drying. The product was clear and the coating could not be peeled off. The coating was readily soluble in water.

Polymers of the homopinic acid and norpinic acid salts are prepared in like manner.

It is to be understood that changes and variations may be made in the aforegoing examples without departing from the spirit and scope of the invention as defined by the appended claims.

I claim:

1. A homopolymer having the following recurring structural units:

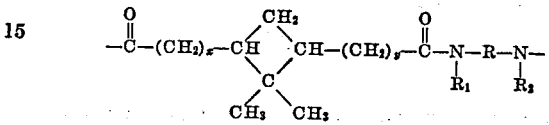

wherein $x$ is a cardinal number from 0 to 1, $y$ is a cardinal number from 0 to 1, R is a divalent organic radical containing at least 2 carbon atoms and selected from the group consisting of aliphatic, aromatic and alicyclic radicals and $R_1$ and $R_2$ are of the group consisting of hydrogen and alkyl radicals.

2. A homopolymer as defined in claim 1 wherein $x=0$, $y=1$, R is a divalent aliphatic radical having the formula

$n$ is an integer from 2 to 20 and $R_1$ and $R_2$ are hydrogen.

3. A homopolymer as defined in claim 1 wherein $x=0$, $y=1$, R is $-CH_2CH_2-$ and $R_1$ and $R_2$ are hydrogen.

4. A homopolymer as defined in claim 1 wherein $x=0$, $y=1$, R is $-(CH_2)_6-$ and $R_1$ and $R_2$ are hydrogen.

5. A homopolymer as defined in claim 1 wherein $x=0$, $y=1$, R is $-(CH_2)_{10}-$ and $R_1$ and $R_2$ are hydrogen.

6. A homopolymer as defined in claim 1 wherein $x=0$, $y=1$, R is

and $R_1$ and $R_2$ are hydrogen.

7. A homopolymer as defined in claim 1 wherein $x=0$, $y=1$, R is $-(CH_2)_3-O-(CH_2)_3-$ and $R_1$ and $R_2$ are hydrogen.

8. A composition of matter which comprises a mixture of a homopolymer as defined in claim 1 and polyhexamethylene adipamide, the homopolymer of claim 1 constituting from about 25% to 50% by weight of the mixture.

9. A homopolymer as defined in claim 1 wherein $x=0$, $y=0$, R is a divalent aliphatic radical having the formula

$n$ is an integer from 2 to 20 and $R_1$ and $R_2$ are hydrogen.

10. A homopolymer as defined in claim 1 wherein $x=1$, $y=1$, R is a divalent aliphatic radical having the formula

$n$ is an integer from 2 to 20 and $R_1$ and $R_2$ are hydrogen.

11. As an article of manufacture, a self-supporting film formed from a homopolymer as defined in claim 1 and having one dimension relatively large with respect to another of its dimensions.

12. As an article of manufacture, a filament formed from a homopolymer as defined in claim 1 and showing orientation along the filament axis.

13. As an article of manufacture, a molding powder formed from a homopolymer as defined in claim 1.

14. In a method for preparing polyamides, the step which comprises reacting at a temperature between about 100° C. and 300° C. a compound selected from the group consisting of acids, halides of acids, amides of acids and esters of acids having the following structural formula

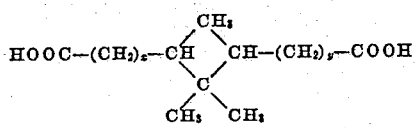

wherein $x$ is a cardinal number from 0 to 1 and $y$ is a cardinal number from 0 to 1, with an organic diamine having the following formula

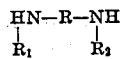

wherein R is a divalent organic radical containing at least 2 carbon atoms and selected from the group consisting of aliphatic, aromatic and alicyclic radicals and $R_1$ and $R_2$ are of the group consisting of hydrogen and alkyl radicals containing 1 to 6 carbon atoms.

15. The method of claim 14 wherein the organic diamine is ethylenediamine.

16. The method of claim 14 wherein the organic diamine is hexamethylenediamine.

17. The method of claim 14 wherein the organic diamine is decamethylenediamine.

18. The method of claim 14 wherein the organic diamine is gamma, gamma' diaminopropyl ether.

19. The method of claim 14 wherein the organic diamine is benzidine.

References Cited in the file of this patent
UNITED STATES PATENTS

| | | |
|---|---|---|
| 2,130,523 | Carothers | Sept. 20, 1938 |
| 2,130,947 | Carothers | Sept. 20, 1938 |
| 2,158,064 | Carothers | May 16, 1939 |
| 2,188,332 | Carothers | Jan. 30, 1940 |
| 2,193,529 | Coffman | Mar. 20, 1940 |
| 2,309,729 | Gordon | Feb. 2, 1943 |
| 2,625,536 | Kirby | Jan. 13, 1953 |

FOREIGN PATENTS

| | | |
|---|---|---|
| 632,997 | Great Britain | Dec. 5, 1949 |

OTHER REFERENCES

Grandperrin: Annales de Chemie, vol. 6, pages 5, 18, 26, 27, 31 and 39, 1936.